United States Patent [19]

Murray, Sr. et al.

[11] Patent Number: 5,497,561
[45] Date of Patent: Mar. 12, 1996

[54] DRYER FOR REMOVING MOISTURE FROM NATURAL GAS

[75] Inventors: Curtis W. Murray, Sr.; Curtis W. Murray, Jr., both of Big Prairie, Ohio

[73] Assignee: Pride of the Hills Mfg., Inc., Big Prairie, Ohio

[21] Appl. No.: 201,271

[22] Filed: Feb. 24, 1994

[51] Int. Cl.⁶ .................................................. E26B 21/06
[52] U.S. Cl. .................................................. 34/80; 96/118
[58] Field of Search .................................. 34/80, 81, 480, 34/472; 96/118, 119, 188, 192

[56] References Cited

U.S. PATENT DOCUMENTS 5,108,472  4/1992  Murray, Sr. ................................. 55/219

Primary Examiner—Henry A. Bennett
Assistant Examiner—Dinnatia Doster
Attorney, Agent, or Firm—Sand & Sebolt

[57] ABSTRACT

A dryer for removing moisture from natural gas includes a hollow pressure vessel with a bottom separator section, an intermediate drying section and an upper drying section. A perforated plate separates the intermediate and upper sections and supports a bed of a dry desiccant material. An annular passage is formed between an inverted down tube which is located within the intermediate section and the cylindrical wall of the vessel. A liquid drain tray separates the intermediate section and the lower separator section. An inlet tube provides communication between the intermediate section and the separator section and is located within the down tube. A sparger plate is spaced above the drain tray and is formed with a plurality of spaced openings providing a total open area of between 35% and 85% of the total area of the plate.

14 Claims, 2 Drawing Sheets

DRYER FOR REMOVING MOISTURE FROM NATURAL GAS

BACKGROUND OF THE INVENTION

1. Technical Field

The invention relates to a gas-moisture separator, and in particular, to an improved dryer for removing moisture from natural gas to enable the gas to be used in high-pressure natural gas vehicle fueling systems. More particularly, the invention relates to an improved sparger plate construction used within the gas dryer to break the gas into smaller bubbles so that the moisture is more easily removed therefrom as it passes through a desiccant bed.

2. Background Information

Natural gas is slowly becoming an alternate fuel source for vehicles to reduce the dependency on oil-derived products, and to provide for a more pollutant-free running vehicle. The natural gas is compressed, generally within the range of between 3500 psi and 5000 psi, in order to carry a sufficient amount in an automobile or light truck to travel a reasonable distance. In order to compress the gas to such high pressures, the gas most have most, if not all, of the water or other liquids removed from it. This liquid or water generally is in the form of moisture or humidity similar to the humidity in the surrounding air.

The current U.S.D.O.T. specification for the water content of natural gas used for motor vehicle fuel is 0.5 (½) pound water per million standard cubic feet (MMSCF) of natural gas. Most currently used methods and apparatus of dehydrating natural gas are unable to economically dry gas to this specification due to the chemical properties and limitations of the desiccants and deliquescents which are used to remove the moisture from the gas. The main known system capable of reaching this moisture specification is an adsorptive system which is very expensive both in capital and operating costs.

Therefore, the need exists for an improved dryer for removing nearly all of the moisture from natural gas enabling it to be compressed to a sufficient high pressure to be able to be utilized as a fuel for automobiles or light trucks.

SUMMARY OF THE INVENTION

Objectives of the invention include providing an improved natural gas dryer for removing moisture from natural gas in a simple and economical manner.

Another objective of the invention is to provide such a gas dryer which has a pressure vessel which meets the required code specifications in order to withstand the pressures required for natural gas vehicle fueling systems, and which contains the drying mechanism in a simple, effective and compact arrangement.

Another objective of the invention is to provide such a gas dryer having an efficient packing column of non-interlocking, cage-like plastic elements through which the gas-liquid mixture is conveyed, thereby creating a minimum pressure drop, and which provides extremely great surface areas which are wetted by the moisture during the circuitous passage of the gas-moisture mixture therethrough.

A still further objective of the invention is to provide such a gas dryer which utilizes a unique sparger plate which spreads the moisture-laden gas evenly and releases it in the smallest possible bubbles prior to the bubbles passing through the packing material and desiccant bed to increase the removal efficiency of the moisture from the gas.

A further objective of the invention is to provide such a gas dryer in which the collected moisture forms a hydrate which is collected in a liquid tray where it is used to attract more moisture from the wetter gas as the gas enters the area containing the liquid tray, which gas then is progressively dried as it rises through the tablets of the desiccant bed making the most efficient use of the desiccant possible.

These objectives and advantages are obtained by the improved natural gas dryer of the invention, the general nature of which may be stated as including a hollow pressure vessel having a lower separator section, an intermediate drying section, and an upper drying section; inlet means formed in the vessel for admitting a gas-moisture mixture into the separator section; a liquid tray separating the separator section and the intermediate section; a sparger plate spaced above the tray and formed with a plurality of spaced openings providing a total open area of between 35% and 85% of the total area of the plate; a down tube extending upwardly from the sparger plate within the intermediate section and having a closed upper end and an open lower end; an inlet tube extending partially upwardly within the down tube and communicating with the separator section; packing material located about the down tube in the intermediate section; perforated support plate means separating the intermediate and upper sections for supporting a desiccant bed; and gas outlet means for discharging dried gas from the upper drying section.

These objectives and advantages are further obtained by the improved method of the invention, the general nature of which may be stated as including the steps of passing a quantity of gas-moisture mixture into a lower section of a pressure vessel; permitting any free fluid within the mixture to collect in said lower section; next moving the mixture upwardly through an inlet tube beyond a liquid tray and beyond a spaced sparger plate and then back down along the outside of said inlet tube within an outer tube and then out under the sparger plate and above the liquid tray; releasing the mixture as small gas bubbles into an intermediate drying section located above the sparger plate by passing said mixture through a plurality of small openings formed in a spaced relationship throughout the area of the sparger plate; passing the bubbles through a bed of packing material located above the sparger plate to remove additional moisture from the gas; next passing the gas bubbles through a bed of dry desiccant material to remove still additional moisture from the gas; and then removing the dried gas from an upper region of the vessel after it passes through the desiccant bed.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

DESCRIPTION OF THE PREFERRED EMBODIMENT

Figure 1:
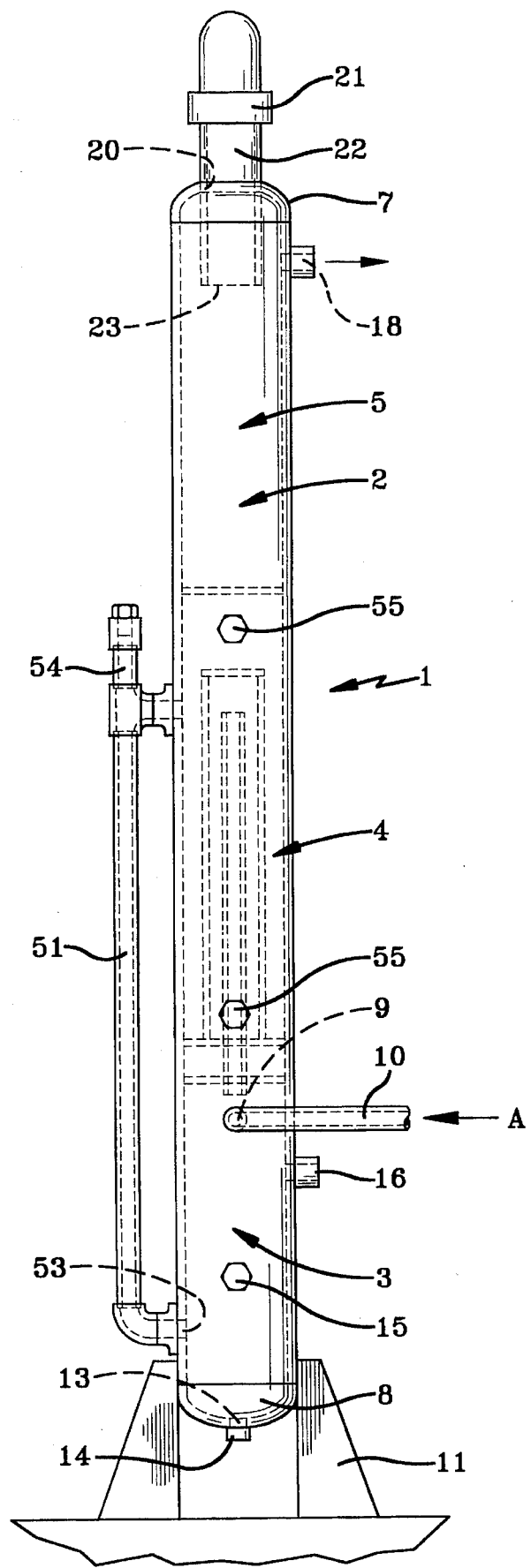
FIG. 1 is a vertical elevational view showing the natural gas dryer of the invention.

The improved natural gas dryer of the invention is indicated generally at 1, and is shown in FIG. 1. Dryer 1 includes a substantially cylindrical vessel 2 which is divided into a lower separator section 3, an intermediate dryer section 4, and an upper drying section 5. Vessel 2 is formed of a cylindrical sidewall 6 and has top and bottom ends which are closed by bulbous semi-spherical heads 7 and 8, respectively, which are normally welded to the cylindrical sidewall 6 of vessel 2. The vessel, including the heads and sidewall, are normally comprised of heavy walled steel components adapted to withstand substantial internal pressures generally ranging from about several hundred psi to 4500 psi.

An inlet line 10 for admitting the natural gas into vessel 2, is mounted in a tangential relationship to the vessel in lower separator section 3 and communicates with an inlet opening 9. The vessel preferably is supported by a plurality of spaced apart leg members 11, which are welded to the bottom portion of vessel 2. A drain opening 13 is formed in the bottom of vessel 2 and is closed by a closure cap 14. If preferred, an automatic drain control may be connected to drain opening 13 of the type shown and described in U.S. Pat. No. 5,108,472, the contents of which are incorporated herein by reference. A clean-out opening and associated closure plug 15 may also be provided in the sidewall of lower separator section 3. A thermometer port 16 may also be provided in lower section 3.

A gas outlet opening 18 is formed in the upper region of upper dryer section 5 and communicates with a take-off pipe (not shown). A desiccant material inlet opening 20 is formed in top end 7 of vessel 2, and is closed by a hammer union closure 21. A tube 22 is mounted on closure 21 and extends a predetermined distance into the upper region of upper section 5 with its bottom end opening 23 being located beneath gas outlet opening 18, the function of which is described further below.

Figure 2:
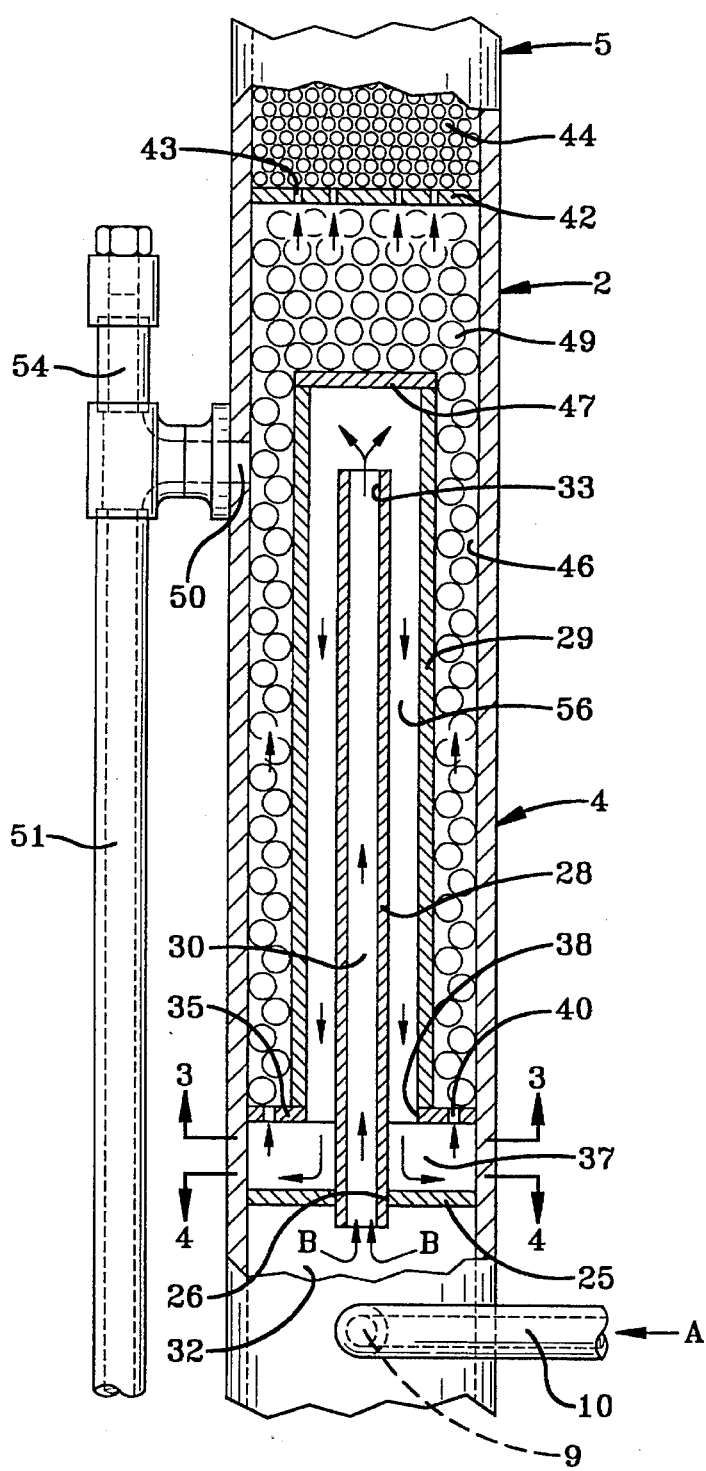
FIG. 2 is an enlarged fragmentary sectional view of the intermediate drying section of the dryer of FIG. 1.

Referring to FIG. 2, intermediate drying section 4 is separated from lower separator section 3 by a fluid collection tray 25 which extends completely across the cylindrical sidewall 6 of vessel 2 and is free of perforations except for a main central opening 26 in which an inlet tube 28 is mounted, preferably by welds or other securement means.

Inlet tube 28 extends vertically upwardly within the hollow interior of intermediate section 4, and is concentrically located within the hollow interior of an outer cylindrical down tube 29. An open bottom end 30 of tube 28 communicates with hollow interior 32 of separator section 3, and a top open end 33 of tube 28 communicates with the interior of down tube 29. In the preferred embodiment, the inner diameter of inlet tube 28 will be equal to or greater than the diameter of inlet opening 9.

Figure 3:
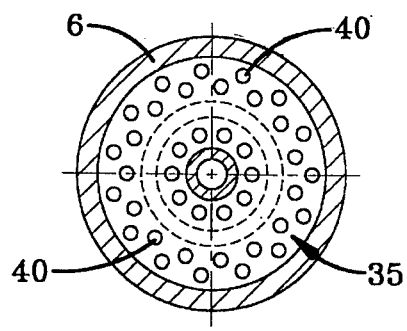
FIG. 3 is an enlarged sectional view taken on line 3—3, FIG. 2.
Figure 4:
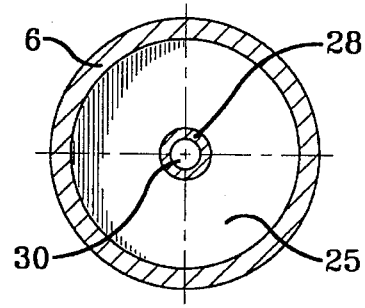
FIG. 4 is an enlarged fragmentary sectional view taken on line 4—4, FIG. 2.

In accordance with one of the main features of the invention, a sparger plate, indicated generally at 35 (FIGS. 2 and 3), is spaced above collection tray 25 forming a void space 37 therebetween. Plate 35 has an annular configuration with an enlarged central opening 38 complementary to the interior diameter of down tube 29. Sparger plate 35 preferably is secured by welding or other attachment means to the bottom open end of down tube 29. A plurality of openings 40 (FIG. 3) are formed in sparger plate 35 and are arranged in an equally spaced pattern throughout the area of the sparger plate. In the preferred embodiment, openings 40 will have a diameter of between 3/16 inch and 1/2 inch, with the open area provided thereby being within the range of between 35% and 85% of the total area of the sparger plate.

Intermediate section 4 is separated from upper section 5 by a perforated support plate 42 which is formed with a plurality of holes 43 and supports a bed of desiccant material 44 which will usually be in pellet form. The preferred desiccant 44 used in the gas dryer of the present invention is manufactured by Clearwater, Inc. of Pittsburgh, Pa., and distributed under its trademark XENTRITE NGV. This particular type of desiccant has been found preferable, although other types of desiccants could be used without materially affecting the concept and advantages of the invention.

Figure 5:
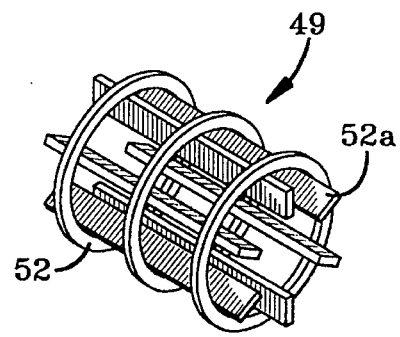
FIG. 5 is a greatly enlarged perspective view of one of the cage-like packing materials.

The annular space 46 formed between the outer surface of cylindrical down tube 29 and vessel wall 6, as well as the space above the top closed end 47 of down tube 29, is filled with a packing material indicated generally at 49. Packing material 49 (FIG. 5) is the same as that described in the above-referenced U.S. Pat. No. 5,108,472, and preferably consists of a plurality of similarly shaped hollow cage-like non-interlocking plastic members 52 and 52a, each having a large surface area. The packing elements may be either spherical or cylindrical in shape, preferably having an overall diameter of about one inch, with very large internal and external surface areas for contact wetting of their surfaces by the moisture in the gas mixture. Such packing material is normally formed of injection-molded polypropylene plastic in various sizes ranging from about one to 3½ inch diameter. The symmetrical geometry of each individual packing element consists of a unique network of ribs, struts and drip rods having an extremely large void space for liquid wetting.

An outlet drain opening 50 (FIG. 2) is formed in vessel sidewall 6 of intermediate section 4, generally adjacent the top of down tube 29, and is connected to an exterior drain pipe 51 which extends along the side of vessel 2. Pipe 51 is discharged through an opening 53 into the bottom of separator section 3 (FIG. 1). A clean-out plug 54 may be mounted in the top of drain pipe 51. A pair of spaced clean-out openings also may be provided in vessel sidewall 6 of intermediate section 4 and closed by plugs 55.

The operation of improved gas dryer 1 and the method of the present invention is as follows. A mixture of gas and moisture enters separator section 3 of the dryer through inlet line 10 (indicated by arrow A, FIGS. 1 and 2). Any free fluids, such as condensed water and compressor oil, fall and collect in the bottom of separator section 3. This fluid, along with the hydrate which is formed when the moisture in the gas is attracted by the deliquescents 44 as described further below, is removed through drain opening 13 to a remote storage container. This drain removal can either be accomplished manually, or can be done automatically by use of a pneumatic or electrically operated liquid level control system, as described in the previously referenced U.S. Pat. No. 5,108,472.

Referring to FIG. 2, the gas (arrow B) then enters inlet tube 28 and passes through the tube and out of open end 33 and then downwardly through an annular passage 56 formed between tubes 28 and 29, and through central opening 38 into space 37 between fluid collection tray 25 and sparger plate 35. The gas then spreads out under the sparger plate and over the entire liquid tray. By sizing the diameter and spacing of the sparger plate holes 40 they spread the gas evenly and release it in the smallest possible bubbles. These gas bubbles then rise through annular space 46 and move upwardly through packing material 49 which breaks up the bubbles as they move therethrough. The moisture will collect on the packing material and will flow downwardly through annular space 46 and through sparger plate holes 40 and into fluid collection tray 25.

The moisture in the gas forms a hydrate upon contacting desiccant bed 44, which hydrate then flows through holes 43 of support plate 42, and down through packing material 49 and into tray 25. The hydrate will eventually rise into annular space 46 until it reaches drain opening 50, where it will then flow through drain pipe 51 and into lower section 3 for subsequent removal through drain hole 13 as described above. This hydrate pool also assists in removing the moisture and water from the gas as it moves through the packing material.

As discussed above, the dryer gas rises above the fluid level of the hydrate, which is controlled by drain opening 50, and passes through holes 43 in support plate 42 and then through the dry desiccant 44. The diameter and placement of holes 43 in plate 42 also ensures minimal pressure drop and maximum dispersion of the gas over the whole bottom surface of the dry bed, while supporting the dry deliquescent tablets. The remaining moisture in the gas then contacts the dry deliquescent tablets which attract the rest of the moisture and forms the hydrate, which moves through annular space 46 and into the liquid tray, where it is used to attract more moisture from the wetter gas as it enters annular space 46 and moves therethrough.

The height of the dry bed of deliquescent tablets is designed to allow ample contact time and surface area for maximum drying along with a reasonable time between deliquescent refills. The method then uses the formed liquid hydrate to further remove some of the moisture from the entering gas, then progressively dries the gas dryer as it rises through the deliquescent tablets to make the most efficient use possible of the deliquescent material.

Since the moisture content of the high-pressure gas is normally low (3–5 lb. water/MMSCF Gas), one liquid tray is sufficient to achieve cost effective, efficient drying. However, if wetter field gas is fed to the dryer and temperatures are high (100° F.+), two or more fluid collection trays may be needed. The deliquescent tablets in the dry bed are refilled through top access opening 20, and the use of tube 23 which extends down into the vessel, controls the maximum height of the dry bed in upper section 5 of the vessel. This ensures that the gas rises above the tablets of bed 44 before leaving the vessel through outlet opening 18, as shown in FIG. 1, without carrying any of the deliquescent tablets or parts thereof with the moving gas stream.

To achieve the most efficient drying and movement of the gas through vessel 2, the vertical spacing of void area 37 between sparger plate 35 and liquid tray 25, indicated at C, is determined by the following formula:

$$C => 2 \left[ \frac{(1/2\, B^2 \pi - 1/2\, A_0^2 \pi)}{B\pi} \right]$$

where B is the internal diameter of down tube 29 and $A_o$ is the outside diameter of inlet tube 28. Distance C will usually be within the range of from one inch to twelve inches.

Likewise, the most efficient size of the internal diameter (B) of down tube 29 is determined by the formula $$B => \sqrt{\frac{(A_I^2 \pi)(3.6) - (A_0^2 \pi)}{\pi}}$$

where $A_I$ is the inside diameter of inlet tube 28.

Accordingly, the improved gas dryer and method of the invention utilizes an improved sparger which breaks up of the gas stream into smaller bubbles which are dispersed generally evenly throughout the area above the sparger plate as they pass generally evenly throughout annular passage 46 and through the associated packing material 49, and subsequently through the desiccant material 44, to ensure better and more efficient removal of the moisture therefrom than occurs in prior driers where larger air bubbles move irregularly through the desiccant bed and packing materials. The even dispersion and breaking up of the gas into smaller bubbles for uniform movement through the drying materials has been found to increase considerably the efficiency of the dryer of the present invention.

Accordingly, the gas dryer of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved natural gas dryer is constructed and used, the characteristics of the construction, and the advantageous, new and useful results obtained; the new and useful structures, devices, elements, arrangements, parts and combinations, and method steps are set forth in the appended claims.

We claim:

1. A natural gas dryer including:

a hollow pressure vessel having a lower separator section, an intermediate drying section, and an upper drying section;

inlet means formed in the vessel for admitting a gas-moisture mixture into the separator section;

a liquid tray separating the separator section and the intermediate section;

a sparger plate spaced above the liquid tray and formed with a plurality of spaced openings providing a total open area of between 35% and 85% of the total area of said plate;

a down tube extending upwardly from the sparger plate within the intermediate section and having a closed upper end and an open lower end;

an inlet tube extending partially upwardly within the down tube and communicating with the separator section;

packing material located about the down tube in the intermediate section;

perforated support plate means separating the intermediate and upper sections for supporting a desiccant bed; and gas outlet means for discharging dried gas from the upper drying section.

2. The gas dryer defined in claim 1 including drain means extending between an upper region of the intermediate section and the separator section for draining collected liquid from the intermediate section into the separator section.

3. The gas dryer defined in claim 2 including outlet means in the separator section for removing collected liquid from the vessel.

4. The gas dryer defined in claim 1 in which the packing material includes a plurality of hollow cage non-interlocking plastic members each having a substantial previous large surface area.

5. The gas dryer defined in claim 4 in which the packing members are formed of polypropylene.

6. The gas dryer defined in claim 1 in which an annular flow passage is formed about the down tube; and in which said passage is filled with the packing material.

7. The gas dryer defined in claim 1 including a fill tube mounted in a top of the vessel and communicating with the upper drying section; and in which said fill tube extends downward partially into said upper section to a level beneath the gas outlet means.

8. The gas dryer defined in claim 1 in which the sparger plate and liquid tray are spaced apart a distance ranging about 1 to 12 inches, said area being devoid of material.

9. The gas dryer defined in claim 1 in which the sparger plate openings have a diameter of generally between 3/16 inch and 1/2 inch.

10. The gas dryer defined in claim 1 in which the sparger plate is formed with a central opening having a diameter substantially equal to and concentric with the internal diameter of the down tube; and in which the inlet tube extends through said central opening.

11. The gas dryer defined in claim 6 in which the down tube has a closed top end spaced below the perforated support plate means; and in which said the space between the closed top end and support plate means is substantially filled with the packing material.

12. The gas dryer defined in claim 2 in which the drain means includes a pipe located externally of and extending downwardly along the vessel between the intermediate section and the separator section.

13. The gas dryer defined in claim 1 in which the internal diameter (B) of the inlet tube is determined by the formula $$B => \sqrt{\frac{(A_I^2 \pi)(3.6) - (A_0^2 \pi)}{\pi}}$$

where $A_I$ is the internal diameter of the inlet tube, and $A_o$ is the outer diameter of said inlet tube.

14. The gas dryer defined in claim 3 in which the drain means is located below the inlet means.

* * * * *